United States Patent [19]
Lichtenberg

[11] Patent Number: 5,738,958
[45] Date of Patent: Apr. 14, 1998

[54] ALLOYS FOR USE AS ACTIVE MATERIAL FOR THE NEGATIVE ELECTRODE OF AN ALKALINE, RECHARGEABLE NICKEL-METAL HYDRIDE BATTERY, AND PROCESS FOR ITS PRODUCTION

[75] Inventor: Frank Lichtenberg, Zeiskam, Germany

[73] Assignee: Varta Batterie Aktiengesellschaft, Hannover, Germany

[21] Appl. No.: 680,520

[22] Filed: Jul. 9, 1996

[30] Foreign Application Priority Data

Jul. 27, 1995 [DE] Germany .................. 195 27 505.5

[51] Int. Cl.$^6$ ................................................... H01M 4/38
[52] U.S. Cl. .................. 429/223; 429/101; 429/224
[58] Field of Search .................. 421/59, 101, 218, 421/224, 223, 900

[56] References Cited

U.S. PATENT DOCUMENTS

| | | |
|---|---|---|
| 5,008,164 | 4/1991 | Furukawa, et al. |
| 5,277,999 | 1/1994 | Orshinsky et al. .......... 429/59 |
| 5,384,209 | 1/1995 | Bouet et al. ............... 429/59 |
| 5,501,917 | 3/1996 | Hong ........................ 429/101 |
| 5,541,017 | 7/1996 | Hong et al. ................ 429/59 |

FOREIGN PATENT DOCUMENTS

| | | |
|---|---|---|
| 0206776 | 12/1986 | European Pat. Off. |
| 0271043 | 6/1988 | European Pat. Off. |
| 0420669 | 4/1991 | European Pat. Off. |
| 451575 | 10/1991 | European Pat. Off. |
| 609609 | 8/1994 | European Pat. Off. |

OTHER PUBLICATIONS

Abstract (EPO) —CN-A-1124412 (Beijing Nonferrous Metal), Jun. 12, 1996.
Abstract (Japan) –JP-A 01-072464 (Toshiba Corp.), Mar. 17, 1989, vol. 013, No. 288 (E-781).
Abstract (Japan) –JP-A-03294444 (Agency of Ind. Science & Technol.), Dec. 25, 1991, vol. 16, No. 128 (C-0924).
Abstract (Japan) –JP-A-06228613 (Daido Steel co. Ltd.), Aug. 16, 1994, vol. 018, No. 605 (M-1706).
T. Sakai et al., "Hydrogen Storage Alloys for Nickel-Metal Hydride Battery", *Zeitschrift für Physikalisch Chemie*, vol. 183, Part I/II, pp. 333–346 (1994), (month n/a).

*Primary Examiner*—M. Nuzzolillo
*Attorney, Agent, or Firm*—Weiser and Associates P.C.

[57] ABSTRACT

To provide an improved high-temperature cycle lifetime, an alloy for use as active material for the negative electrode of an alkaline, rechargeable nickel-metal hydride battery has the composition $Mm_{1-u}E_uNi_vCo_wAl_xMn_yM_z$, where Mm is a misch metal including La and Ce, and which can further include Pr, Nd and/or other lanthanides,
E is Ti and/or Zr, with $0.01 \leq u \leq 0.1$, and
M is Fe and/or Cu, with $0 \leq z \leq 0.4$, wherein
$0.2 \leq w \leq 0.4$,
$0.3 \leq x \leq 0.5$,
$0.2 \leq y \leq 0.4$, and
$4.9 \leq v+w+x+y+z \leq 5.1$.

25 Claims, 4 Drawing Sheets

ALLOYS FOR USE AS ACTIVE MATERIAL FOR THE NEGATIVE ELECTRODE OF AN ALKALINE, RECHARGEABLE NICKEL-METAL HYDRIDE BATTERY, AND PROCESS FOR ITS PRODUCTION

BACKGROUND OF THE INVENTION

The present invention relates to an alloy for use as active material for the negative electrode of an alkaline, rechargeable nickel-hydride battery, and a process for its production.

Alloys of the type $AB_5$, where A corresponds to one or more of the elements Ti, Zr, La, Ce, Pr and/or Nd, and B corresponds to Ni, possibly in combination with other elements selected from the group including Co, Al, Mn, Cu, Cr, Fe and/or V, are known in many different chemical compositions. These alloys can be produced by a variety of metallurgical processes. For example, EP-A 0271043 discloses alloys which conform to the above-mentioned composition and which are used as electrode material in alkaline, rechargeable nickel-hydride cells. Also, T. Sakai et al., *Zeitschrift für physikalische Chemie* 183, pages 333–346 (1994), disclose the use of alloys corresponding to the type $AB_5$ as the negative electrode material in alkaline, rechargeable nickel-hydride cells.

Experimental data on the known alloys indicates that cobalt is necessary as an alloying component to achieve a sufficiently high cycle lifetime. With increasing Co content, the cycle lifetime increases. However, the cell's maximum discharge capability decreases with increasing Co content, especially at low temperatures (i.e., in the range from −45° C. to 0° C.). Cobalt is also a costly, scarce raw material which often experiences significant price fluctuations.

As a result, known alloys with a high Co content tend to have a high capacity and good cycle stability at room temperature. However, an improvement in cycle lifetime remains desirable, especially in cases involving high temperature storage of the cells (i.e., at temperatures of about 45° C.).

SUMMARY OF THE INVENTION

It is therefore the object of the present invention to provide an alloy and a process for its production which, when used as negative electrode material in an alkaline, rechargeable nickel-hydride cell, imparts to the cell a higher cycle lifetime, especially at high temperatures.

This and other objects which will become apparent are achieved in accordance with the present invention with an alloy which is useful as active material for the negative electrode of an alkaline, rechargeable nickel-metal hydride battery, having the following composition:

Mm is a misch metal including La and Ce, and which can further include Pr, Nd and/or other lanthanides,
E is Ti and/or Zr, with $0.01 \leq u \leq 0.1$, and
M is Fe and/or Cu, with $0 \leq z \leq 0.4$, wherein
$0.2 \leq w \leq 0.4$,
$0.3 \leq x \leq 0.5$,
$0.2 \leq y \leq 0.4$, and
$4.9 \leq v+w+x+y+z \leq 5.1$.
For the Ni component of the alloy, v is in the range of $3.2 \leq v \leq 4.4$.

The alloys of the present invention have particularly good high-temperature cycle stability in alkaline, rechargeable nickel-hydride cells if the molten alloys are spray-vaporized, then tempered (preferably at a temperature of from 700° C. to 900° C., for 2 to 4 hours) and subsequently ground. Spray-vaporized particles of the alloy composition of a size less than a specified maximum size (preferably, a maximum size of from 100 to 150 μm) are preferably screened out prior to being tempered and ground. Through such grinding, the spherical shape of the particles is broken down. As a result, electrical contact between the particles in the electrode is improved, mass utilization is increased, and the capacity is simultaneously enhanced.

For further detail regarding the negative electrode active material of the present invention, reference is made to the detailed description provided below in conjunction with the following illustrations.

DETAILED DESCRIPTION OF PREFERRED EMBODIMENTS

Figure 1:
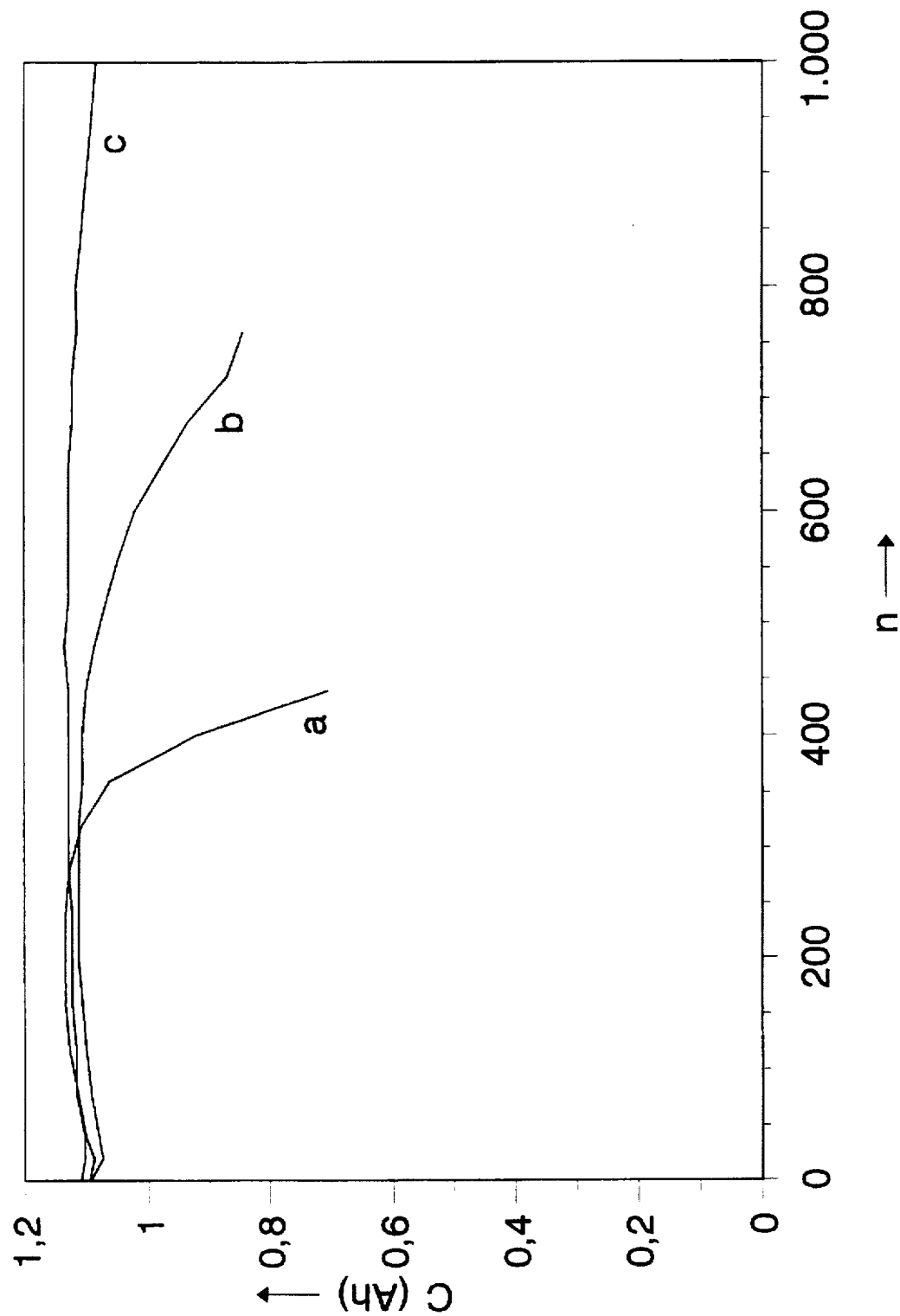
FIG. 1 is a graph showing the 1C cycle lifetime of cells, at 21° C., for Reference Examples 1a, 1b and 1c.

The alloys of the present invention are primarily used as an active material for the negative electrode of an alkaline, rechargeable nickel-metal hydride battery. Generally, such alloys have the composition:

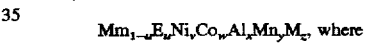

Mm is a misch metal including La and Ce, and which can further include Pr, Nd and/or other lanthanides,
E is Ti and/or Zr, with $0.01 \leq u \leq 0.1$, and
M is Fe and/or Cu, with $0 \leq z \leq 0.4$, wherein
$0.2 \leq w \leq 0.4$,
$0.3 \leq x \leq 0.5$,
$0.2 \leq y \leq 0.4$, and
$4.9 \leq v+w+x+y+z \leq 5.1$.

It has been found that advantageous alloys contain as the misch metal (Mm) a combination of 25–60 wt.-% La and 20–50 wt.-% Ce, and other lanthanides as the remainder. When Fe and Cu are used together, the preferred ratio of Fe/Cu is in the range of $0.5 \leq Fe/Cu \leq 2$. When Zr and Ti are used together, the preferred ratio is in the range of $2 \leq Zr/Ti \leq 3$. Particularly advantageous alloys have the composition $Mm_{0.97}Zr_{0.03}Ni_4Co_{0.3}Al_{0.4}Mn_{0.3}$ or $Mm_{0.97}Ti_{0.03}Ni_4Co_{0.3}Al_{0.4}Mn_{0.3}$.

REFERENCE EXAMPLE 1

Alloys of the composition $MmNi_{4.3-x}Co_xAl_{0.4}Mn_{0.3}$ were produced by a conventional method (i.e., melted in an induction furnace, cast and ground into a powder). Three variants of the alloy were produced including an Example a, with x=0.3, an Example b, with x=0.5, and an Example c, with x=0.7.

Each of the variants 1a, 1b and 1c were subjected to x-ray diffraction, and it was found that the x-ray diffraction spectrum of each powder sample showed only those peaks which can be assigned to an $AB_5$ type structure. Such materials are therefore designated as single phase materials.

The capacities of the three variants were determined by electrochemical measurement of an open half cell of about 300 mAh/g. For such measurement, the test cells included an alloy compacted with Ni powder, a KOH electrolyte with $\rho=1.3$ g/cm$^3$, and were conditioned by charging and discharging at 100 mA/g to a final discharge voltage of −700 mV (against Hg/HgO), at a temperature of 25° C. The measured capacities were found to be nearly independent of the parameter x.

REFERENCE EXAMPLE 2

Alloys of the compositions $MmNi_{3.8}Co_{0.3}Al_{0.4}Mn_{0.3}Fe_{0.2}$ (Reference Example 2C) and $MmNi_{3.8}Co_{0.3}Al_{0.4}Mn_{0.3}Cu_{0.2}$ (Reference Example 2D) were produced by melting the stated composition, spray vaporizing the melted composition, screening out those spherical particles obtained with a grain size<125 µm, and subsequently tempering the result for three hours at 800° C. in a vacuum furnace. The samples were then ground before use.

EXAMPLE 1a

The alloy $Mm_{0.97}Zr_{0.03}Ni_4Co_{0.3}Al_{0.4}Mn_{0.3}$ was produced by pouring a melt containing the stated elements in the ratio indicated. The product was tempered at 1000° C. in a vacuum furnace, and subsequently finely ground. Particles with a grain size<75 µm were screened out.

EXAMPLE 1b

The alloy of Example 1a was repeated, with the difference that the melt had the composition $Mm_{0.97}Ti_{0.03}Ni_4Co_{0.3}Al_{0.4}Mn_{0.3}$.

EXAMPLE 2A

A melt with the composition of Example 1a was spray vaporized, and those spherical particles obtained with a grain size<125 µm were screened out. The resulting alloy was then tempered in a vacuum furnace for three hours at 800° C., and then ground.

EXAMPLE 2B

An alloy with the composition of Example 1b was produced under the conditions of Example 2A.

The alloys produced according to Examples 1a and 1b, and 2A and 2B, as well as the alloys of Reference Examples 1 and 2, were used in AA cells as active material in the negative electrodes. All of the AA cells were fabricated and processed as follows:

Negative electrode: a calendered electrode comprising a mixture of an alloy, a binder and carbon rolled on a Ni perforated sheet;

Positive electrode: a Ni foam electrode formed by pasting nickel hydroxide into a Ni foam skeleton (paste; 90% nickel hydroxide, 10% cobalt oxide, binder and water);

Separator: a conventional type (such as polyamide fleece);

Electrolyte: a 6.5 molar KOH, 0.5 molar LiOH solution in a dose of 2.1 ml per cell;

Start up: an initial storage for 72 hours at 45° C., followed by 1 cycle including charging for 15 hours at 0.1 C., storage over 24 hours at 60° C., and discharging at 0.2 C. to a final discharge voltage of 1.0 volt, and 3 cycles, each including charging for 7 hours at 0.2 C., a pause of 0.25 hours, and discharging at 0.2 C. to a final discharge voltage of 0.9 volts.

Figure 2:
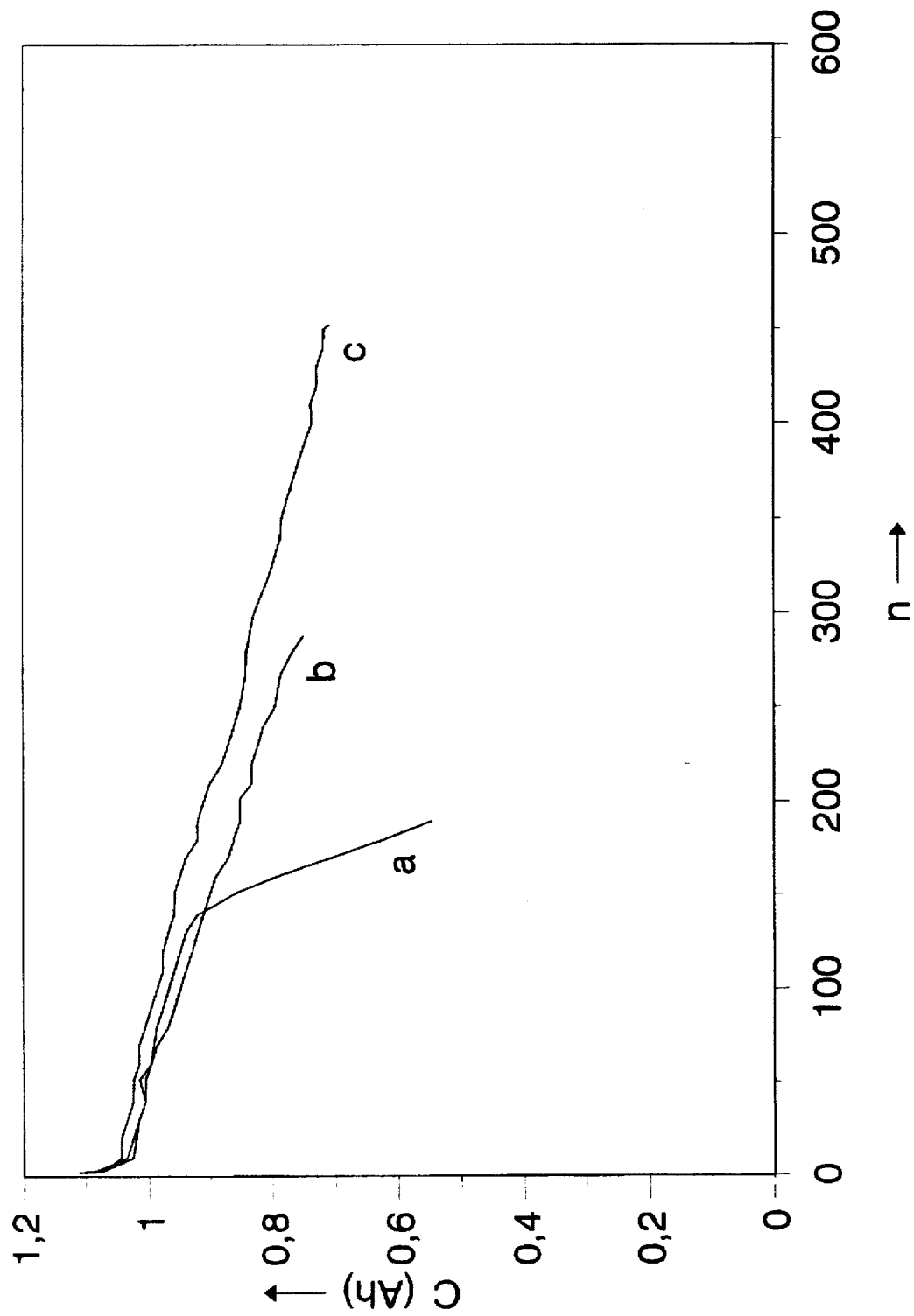
FIG. 2 is a graph showing the 1C cycle lifetime of cells, at 45° C., for Reference Examples 1a, 1b and 1c.

FIGS. 1 and 2 illustrate cycling of the cells of the Reference Examples over time. In FIG. 1 , curves a, b, c illustrate the cycling of cells fabricated with the alloys of Reference Examples 1a, 1b and 1c, respectively, at a temperature of 21° C. FIG. 2 illustrates the cycling of corresponding cells at a temperature of 45° C. The expected improvement in cycle lifetime is apparent as the Co content of the alloy increases.

Figure 3:
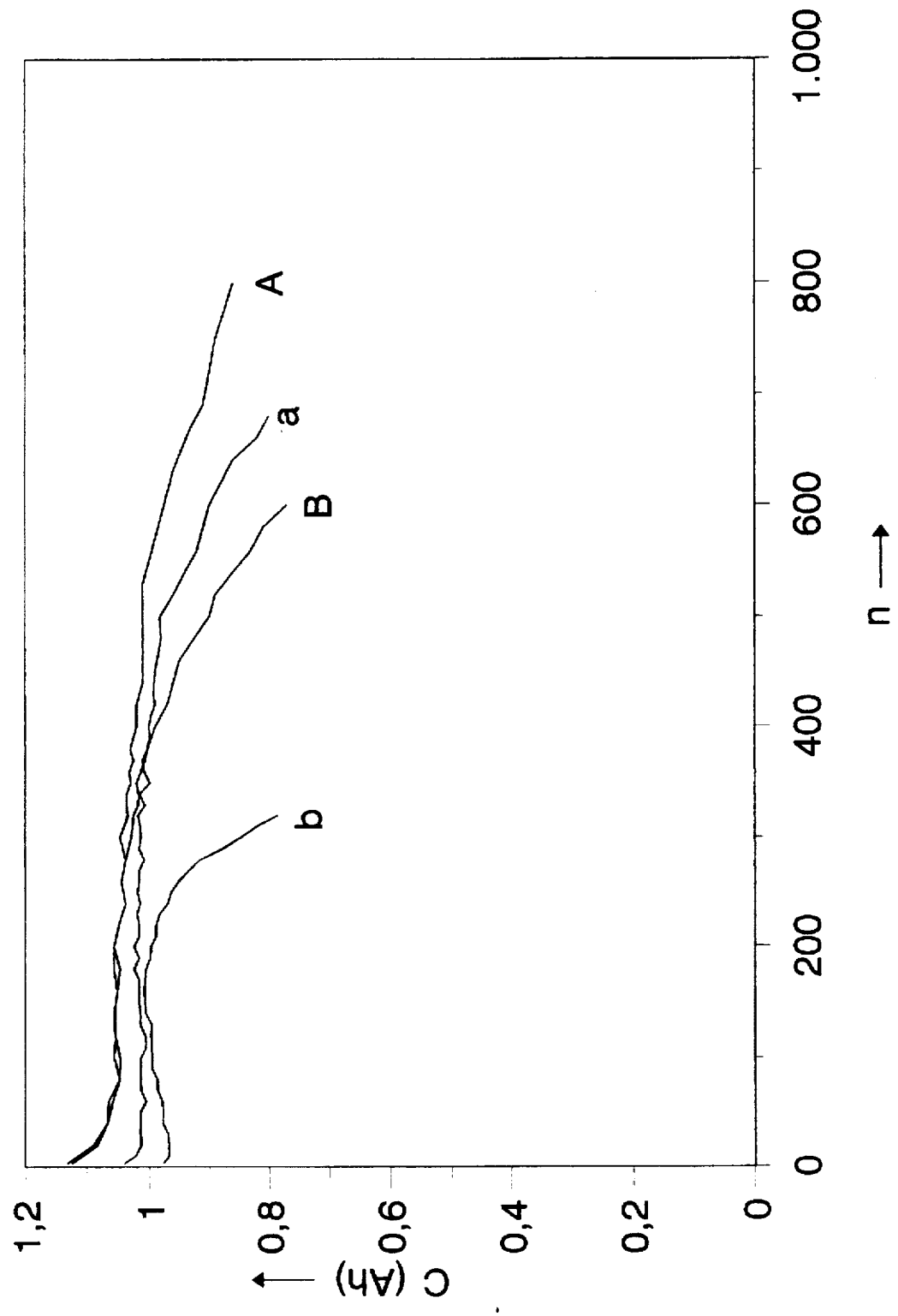
FIG. 3 is a graph showing the 1C cycle lifetime of cells of the present invention, at 21° C.

FIG. 3 similarly illustrates cycling of the cells of the present invention (the Examples 1a, 1b, 2A and 2B) over time, at 21° C. FIG. 3 shows that the alloys of the present invention display a high cycle stability, similar to the performance of the Reference Examples (as shown in FIG. 1).

Figure 4:
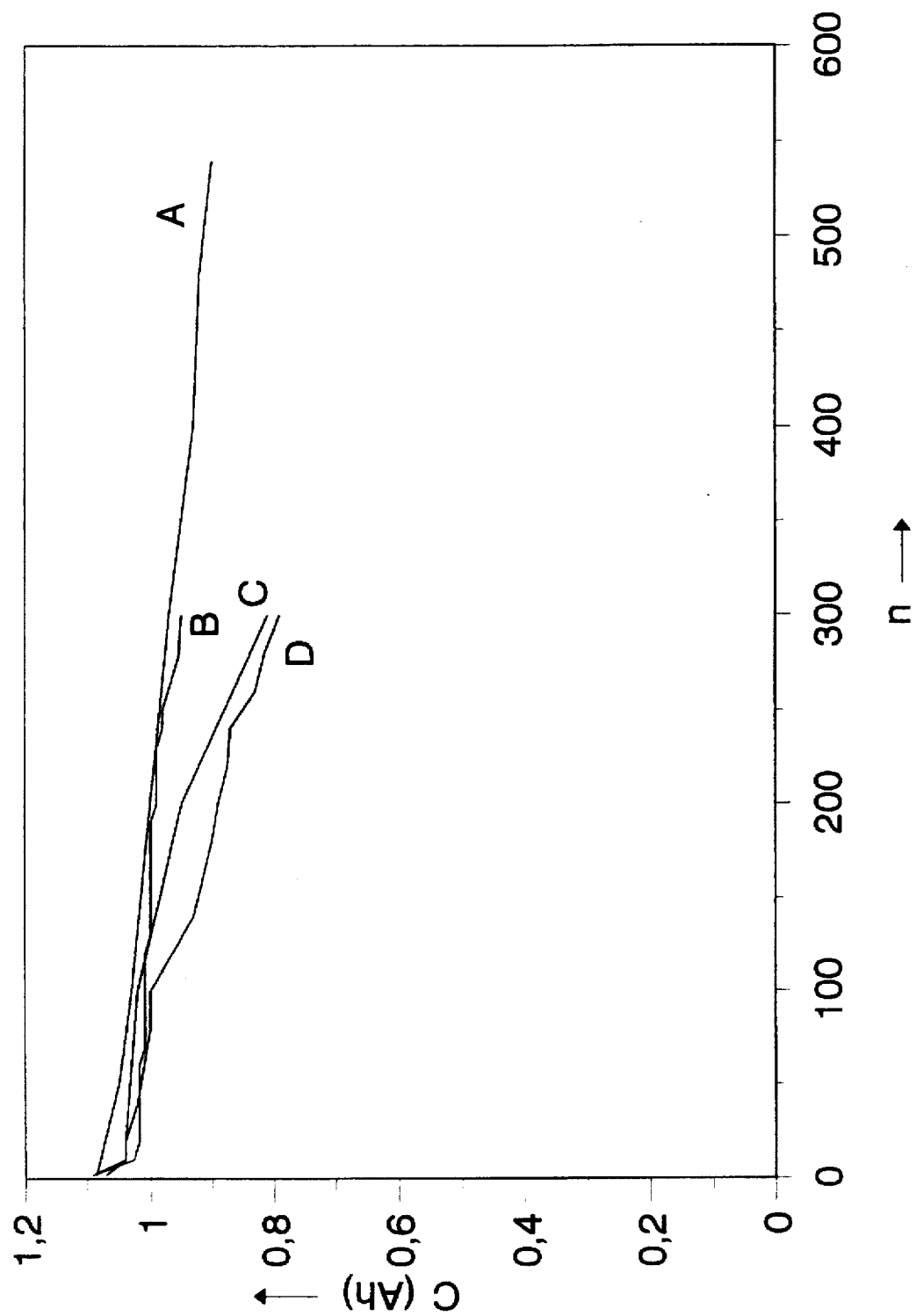
FIG. 4 is a graph showing the 1C cycle lifetime of cells of the present invention, at 45° C., compared to Reference Examples 2C and 2D.

FIG. 4 illustrates the cycling of cells according to the present invention (Examples 2A and 2B) compared with the prior cells of Reference Examples 2C and 2D. FIG. 4 shows the improved high temperature cycle stability of alloys according to the present invention, as compared to the prior alloys of the Reference Examples. While the Reference Examples reached a final discharge capacity (i.e., 80% of the initial capacity) after about 300 cycles, the alloys of the present invention could achieve up to 550 cycles before reaching this final discharge capacity.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An alloy of the $AB_5$ type for use as active material for a negative electrode of an alkaline, rechargeable nickel-metal hydride battery, having a composition:

$Mm_{1-u}E_uNi_vCo_wAl_xMn_yM_z$, wherein

Mm is a misch metal including La and Ce,

E is Ti, Zr, or a combination of Ti and Zr, with $0.01 \leq u \leq 0.1$, and

M is Fe, Cu, or a combination of Fe and Cu, with $0 \leq z \leq 0.4$, wherein $0.2 \leq w \leq 0.4$, $0.3 \leq x \leq 0.5$, $0.2 \leq y \leq 0.4$, and $4.9 \leq v+w+x+y \leq 5.1$.

2. The alloy of claim 1 wherein the misch metal further includes other lanthanides.

3. The alloy of claim 2 wherein the other lanthanides include Pr, Nd, or a combination of Pr and Nd.

4. The alloy of claim 2 wherein the misch metal contains 25 to 60 wt.-% La, 20 to 50 wt.-% Ce, and the other lanthanides as a remainder.

5. The alloy of claim 1 wherein the alloy simultaneously includes Fe and Cu in a ratio of Fe to Cu lying in a range of $0.5 \leq Fe/Cu \leq 2$.

6. The alloy of claim 1 wherein the alloy simultaneously includes Zr and Ti in a ratio of Zr to Ti lying in a range of $2 \leq Zr/Ti \leq 3$.

7. The alloy of claim 1 having the composition $Mm_{0.97}Ti_{0.03}Ni_4Co_{0.3}Al_{0.4}Mn_{0.3}$.

8. The alloy of claim 1 having the composition $Mm_{0.97}Zr_{0.03}Ni_4Co_{0.3}Al_{0.4}Mn_{0.3}$.

9. A process for producing the alloy of claim 1, comprising the steps of spray vaporizing a molten alloy of the composition defined in claim 1, screening out spherical particles of a size less than about 150 µm, tempering the spray vaporized screened alloy composition, and grinding the tempered alloy composition.

10. The process of claim 9 wherein the tempering is at a temperature of from 700° C. to 900° C.

11. The process of claim 10 wherein the temperature is about 800° C.

12. The process of claim 10 wherein the tempering is performed for from 2 to 4 hours.

13. The process of claim 12 wherein the tempering is performed for about 3 hours.

14. The process of claim 9 wherein the tempering is at a temperature of from 800° C. to 1000° C.

15. The process of claim 14 wherein the temperature is about 1000° C.

16. The process of claim 9 wherein the spherical particles screened out have a size less than about 125 μm.

17. The process of claim 16 wherein the spherical particles screened out have a size less than about 75 μm.

18. A negative electrode for an alkaline, rechargeable nickel-metal hydride battery which comprises the alloy of claim 1.

19. An alkaline, rechargeable nickel-metal hydride battery which comprises the negative electrode of claim 18.

20. The battery of claim 19 which further comprises a positive Ni-foam electrode.

21. The alloy of claim 1 wherein $z \leq 0.2$.

22. An alloy of the $AB_5$ type for use as active material for a negative electrode of an alkaline, rechargeable nickel-metal hydride battery, having a composition consisting essentially of:

$Mm_{1-u}E_uNi_wCo_xAl_yMn_yM_z$, wherein

Mm is a misch metal including La and Ce,

E is Ti, Zr, or a combination of Ti and Zr, with $0.01 \leq u \leq 0.1$, and

M is Fe, Cu, or a combination of Fe and Cu, with $0 \leq z \leq 0.4$, wherein $0.2 \leq w \leq 0.4$, $0.3 \leq x \leq 0.5$, $0.2 \leq y \leq 0.4$, and $4.9 \leq v \leq w+x+y \leq 5.1$.

23. The alloy of claim 7 wherein the alloy composition has the formula:

(a) $Mm_{0.97}Zr_{0.03}Ni_4Co_{0.3}Al_{0.4}Mn_{0.3}$ or (b) the alloy has the same formula except that Zr is replaced by Ti in the same amount.

24. A negative electrode for an alkaline rechargeable nickel-metal hydride battery which comprises the alloy (a) or (b) of claim 23.

25. A battery which comprises the negative electrode of claim 24 and a positive Ni-foam electrode.

* * * * *